United States Patent [19]

Dummer

[11] 3,936,708

[45] Feb. 3, 1976

[54] TRIGGER SPEED CONTROL SWITCH WITH PLASTIC PACK SEMI-CONDUCTOR

[75] Inventor: Merlin R. Dummer, Arab, Ala.

[73] Assignee: Cutler-Hammer, Inc., Milwaukee, Wis.

[22] Filed: July 9, 1974

[21] Appl. No.: 486,767

[52] U.S. Cl. .................................. 318/249; 200/157
[51] Int. Cl.² ............................................ H02P 5/16
[58] Field of Search ........... 200/157; 318/249, 305, 318/347, 349

[56] References Cited

UNITED STATES PATENTS

| | | | |
|---|---|---|---|
| 3,439,248 | 4/1969 | Winchester et al. | 318/349 X |
| 3,536,973 | 10/1970 | Matthews et al. | 318/345 |
| 3,775,576 | 11/1973 | Brown | 200/157 |
| 3,842,328 | 10/1974 | Supel et al. | 318/249 |

*Primary Examiner*—Robert K. Schaefer
*Assistant Examiner*—W. E. Duncanson, Jr.
*Attorney, Agent, or Firm*—H. R. Rather; Wm. A. Autio

[57] ABSTRACT

A portable tool double-pole trigger switch enclosing a speed control circuit that includes a plastic pack SCR (semi-conductor controlled rectifier) of the sensitive gate type, a capacitor and a variable resistor. In a first version, the mounting tab of the SCR is soldered to a connector that is contacted by the resistor slider. A ceramic capacitor may be used by soldering its leads between the cathode and gate terminals of the SCR, the mounting tab serving as the anode terminal. A chip capacitor may be used by soldering it to bridge the cathode and gate terminals. In another version, the mounting tab may be arranged to be contacted directly by the resistor slider, thus eliminating the aforesaid connector.

10 Claims, 8 Drawing Figures

Fig. 4
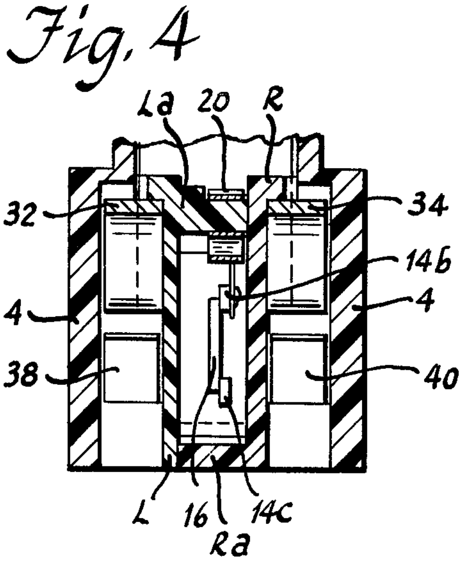
Fig. 5
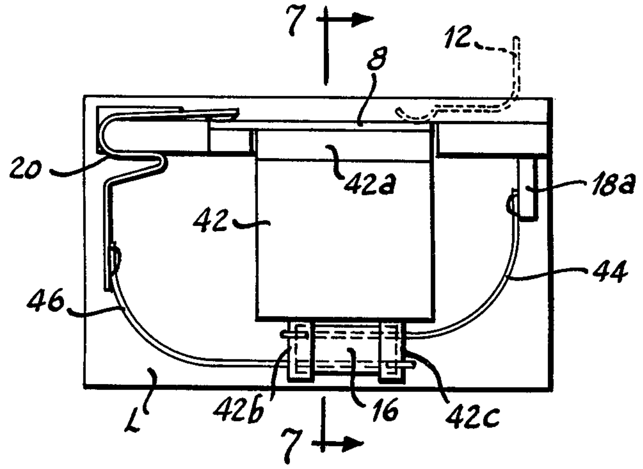
Fig. 7
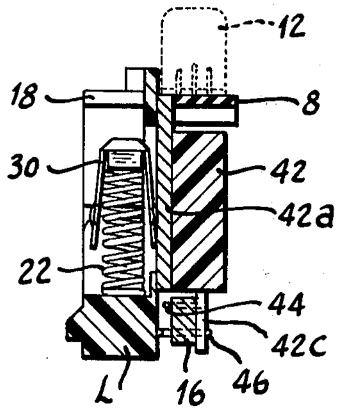
Fig. 6
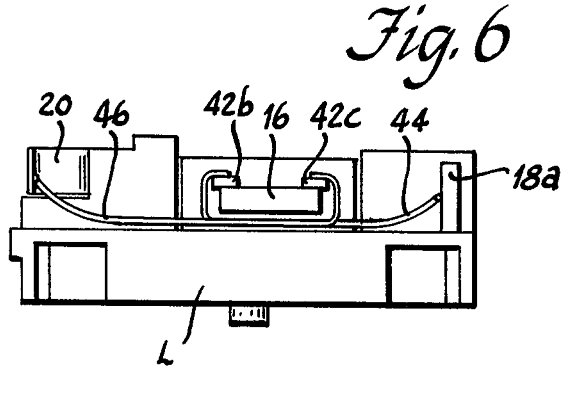
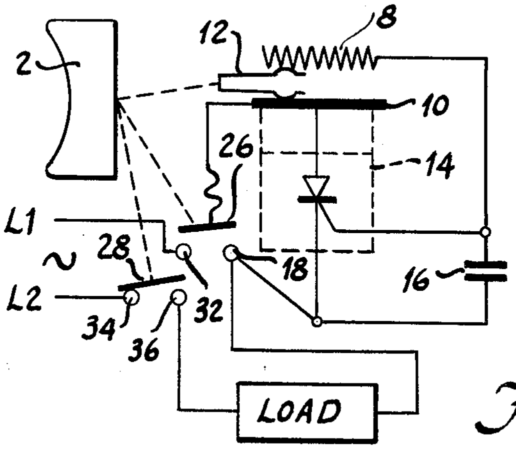
Fig. 8

TRIGGER SPEED CONTROL SWITCH WITH PLASTIC PACK SEMI-CONDUCTOR

BACKGROUND OF THE INVENTION

Portable tool double-pole trigger switches for speed control have been known heretofore. H. W. Brown U.S. Pat. No. 3,775,576, dated Nov. 27, 1973, shows such a double-pole speed control trigger switch. However, in that and other prior art devices of that type, a large heat sink has been required, to which the semi-conductor means has been mounted to dissipate the heat. This heat sink took up a lot of room inside the base, thus requiring the use of a special small semi-conductor device that could be soldered directly to the heat sink. While these prior devices have been useful for their intended purposes,, this invention relates to improvements thereover.

SUMMARY OF THE INVENTION

This invention relates to double-pole speed control trigger switches for portable tools.

An object of the invention is to provide an improved speed control trigger switch.

A specific object of the invention is to provide a speed control trigger switch using a standard plastic pack semi-conductor.

A more specific object of the invention is to provide a speed control trigger switch with a plastic pack semi-conductor thereby eliminating the heat sink and using only the heat sinking capability of the mounting tab of such semi-conductor.

Another specific object of the invention is to provide a speed control trigger switch with a sensitive gate semi-conductor of the plastic pack type thereby eliminating the need for a separate "trigger" diode.

Another specific object of the invention is to provide a speed control trigger switch with a plastic pack semi-conductor having a mounting tab serving both for mounting and for the anode connection, and wherein a chip capacitor is connected directly across the cathode and gate terminals thereby eliminating any wires between the capacitor and semi-conductor.

Other objects and advantages of the invention will hereinafter appear.

BRIEF DESCRIPTION OF THE DRAWINGS

FIG. 4 is a cross-sectional view taken along line 4—4 of FIGS. 1 and 3 to show the left pole compartment, the center, speed control circuit compartment and the right pole compartment;

FIG. 5 is a view of the left base half like FIG. 3 but showing a modification of the invention;

FIG. 6 is a bottom view of the left base half of FIG. 5;

FIG. 7 is a cross-sectional view taken along line 7—7 of FIG. 5; and

FIG. 8 is a circuit diagram showing how the double-pole speed control trigger switch is connected to a power supply and load.

DESCRIPTION

Figure 1:
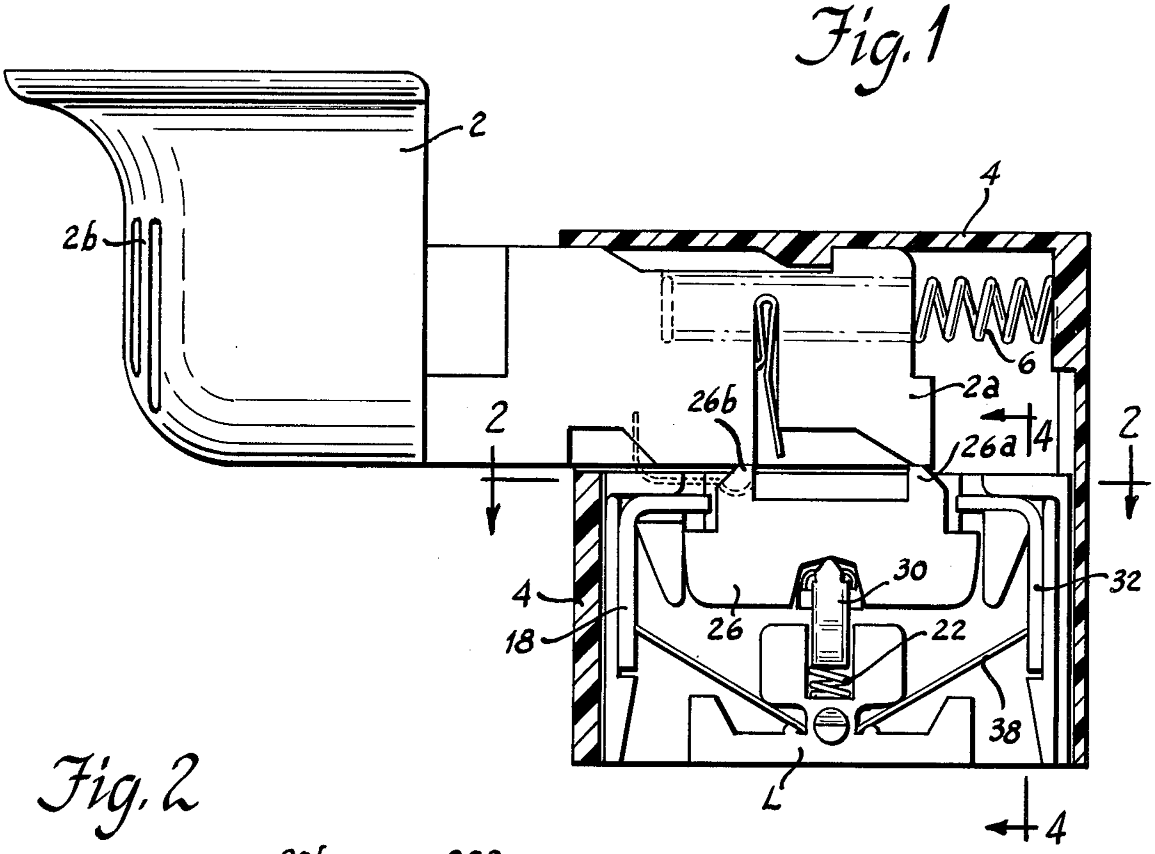
FIG. 1 is an enlarged left side elevational view of the double-pole speed control trigger switch with the left side of the frame broken away substantially along lone 1—1 of FIG. 2 to show the left pole of the two-pole switch, the shunting contact and connectors in the left compartment.

Referring to FIGS. 1-4, there is shown a self-enclosed double-pole speed control trigger switch constructed in accordance with the invention. As shown therein, the switch comprises a spring biased trigger 2 mounted for linear sliding movement in a switch housing. This housing comprises a frame 4 and a pair of base halves designated as left base L and right base R, respectively, most clearly shown in FIGS. 2 and 4. This frame clamps the two halves of the split base together and also clamps slidable rear portion 2a of the trigger on top of the base L, R so that finger engaging portion 2b extends forwardly under the force of trigger return spring 6 for depression by the forefinger of the user.

To form a center compartment for the speed control components, the left and right base halves L and R are provided with upper and lower ledges La and Ra, respectively, as shown in FIG. 4, each abutting the other base half. Ledge Ra extends toward the left flush with the bottom of the base and abuts base half L. Ledge La extends toward the right against base half R at a location a short distance below the top of the base to provide a defined space above this ledge for resistor strip 8 and connector 10 arranged side by side and for sliding contact 12 as shown in FIGS. 2-3.

This ledge L*a* and base half R are provided with means holding them in registration with one another to prevent them from moving in any direction in a vertical plane as seen in FIG. 4 while the surrounding frame holds them from spreading apart. This means comprises suitable projections and notches as more specifically described in the aforementioned Brown patent.

Figure 2:
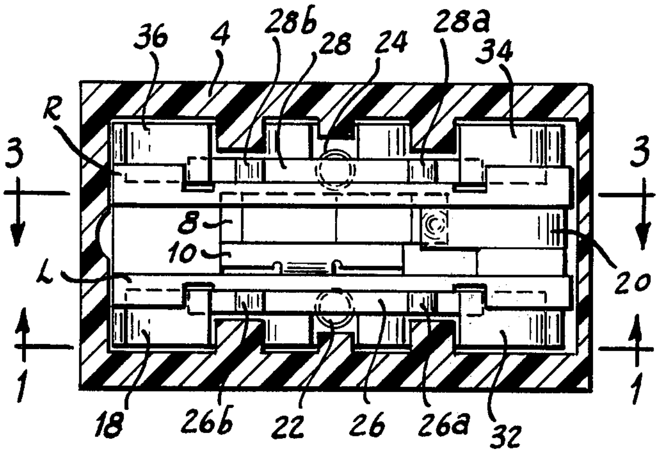
FIG. 2 is a horizontal cross-sectional view taken along line 2—2 of FIg. 1 to show a top view of the split base.

Connector 10 is provided with a flat vertical portion 10*a* that is suspended from ledge L*a* by its T-shaped upper portion, marked 10 in FIG. 2. This flat vertical portion of the connected is soldered to the right surface of mounting tab 14*a* of semic-conductor 14. Thus the semi-conductor is mounted and electrically connected to the connector and held in place in the center compartment.

Figure 3:
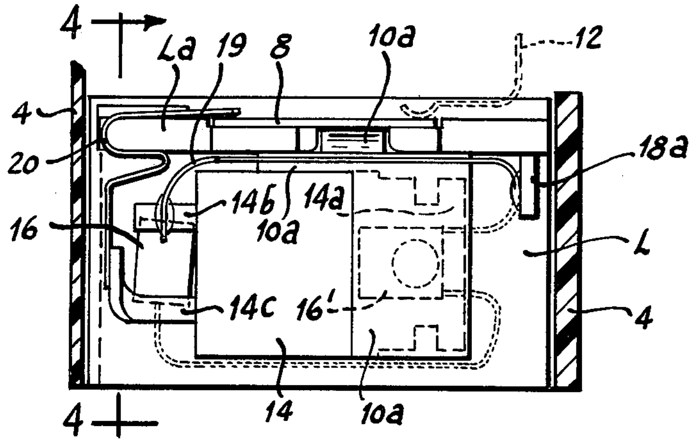
FIG. 3 is a cross-sectional view taken substantially along line 3—3 of FIG. 2 to show the speed control elements mounted to the left base half in the center compartment.

As shown in FIG. 3, alternative capacitors 16 and 16′ may be used with the plastic pack semi-conductor as shown in solid lines and broken lines, respectively. Capacitor 16 is a chip capacitor and is soldered directly across cathode terminal 14*b* and gate terminal 14*c* of the semi-conductor. This eliminates any requirement for wire leads from the capacitor to the semi-conductor. Cathode terminal 14*b* is connected by a bare wire 19 to terminal 18*a* of shunting contact 18 shown in FIG. 1. As will be apparent, a lateral tab extends from stationary contact 18 toward the right through a hole in the left base half to form terminal 18a in the center compartment. The purpose of this connection will become apparent in connection with the description of the circuit diagram in FIG. 8.

Alternatively, a ceramic capacitor 16′ may be used in FIG. 3. This capacitor has two leads that are connected to gate terminal 14*c* and shunting-contact terminal 18*a* as shown in dotted lines in FIG. 3, the capacitor being supported by its wire leads within the center compartment. While one lead of this capacitor 16′ is connected to terminal 18*a*, it could instead be connected to cathode terminal 14*b* since terminals 14*b* and 18*a* are connected together by a wire 19.

Semi-conductor 14 is a sensitive gate SCR (semi-conductor controlled rectifier). By "sensitive gate" is meant an SCR that can be fired into conduction by a smaller gate current, typically a current of less than one hundred microamps, whereas a conventional SCR requires a firing current of many milliamps. For this reason, speed control circuits using conventional SCR's have required a trigger diode in the gate circuit to develop sufficient current for firing the SCR and to maintain control of the firing angle by adjusting the resistor. However, with the use of the sensitive gate SCR, the trigger diode can be eliminated since the firing point is more of a function of capacitor voltage rather than gate current whereby the firing angle can be controlled by adjustment of resistor 8.

This semi-conductor can be provided with its plastic package and a mounting tab 14*a* that extends to the right therefrom as shown in FIG. 3. This tab typically has a round hole for screw mounting and a pair of notches at its edges for other mounting methods as shown in broken lines through flat portion 10*a* of the connector. This tab extends substantially throughout the rear surface of the plastic pack to which the latter is molded. The SCR within the plastic pack is connected to this tab so that this tab can be used as the anode terminal thereof.

As shown in FIG. 3, a connector strap 20 connects gate terminal 14*c* of the semi-conductor to the rear end of resistor strip 8. For this purpose, connector strap 20 is provided with a reentrant loop having a bias whereby it is pressed on and grips the rear end of ledge La so that the protuberance at its upper end presses with a spring force onto resistor strip 8 for a good electrical connection.

As shown in FIGS. 1 and 2, helical compression springs 22 and 24 bias movable butt contacts 26 and 28 into closed positions and the trigger is provided with cam surfaces for operating these movable butt contacts. Butt contact 26 is a flat piece of electrically conducting metal such as copper and is provided with a center notch in its lower edge into which connector cap 30 is seated. One arm of cap 30 contacts the mounting tab of the plastic pack semi-conductor through an aperture in the left base-half. A shoulder at the rear end of contact 26 underlies stationary contact 32 and forms a first pole of the double-pole switch for connecting one power line L1 to the speed control circuit as shown in FIG. 8, the circuit going through connector cap 30. A shoulder at its forward end underlies stationary contact 18 and forms a shunting contact for by-passing the speed control circuit for full speed operation.

Movable contact 28 is like butt contact 26 except that it has only one circuit closing contact at its forward end and its rear end forms a connector always in engagement with connector 34. Thus, butt contact 28 is provided with a like notch seat at its lower center for spring 24. A shoulder at its forward end underlies stationary contact 36 and forms the second pole of the double-pole switch for connecting the other power line L2 to the load (motor) as shown in FIG. 8. A similar shoulder at its rear end constantly engages the underside of connector 34 to which the other power line is adapted to be connected.

As shown in FIG. 1, movable butt contact 26 is provided with a pair of upwardly projecting cam followers including a rear cam follower 26*a* and a forward cam follower 26*b*. These two cam followers are pressed upwardly against the trigger by spring 22.

Movable butt contact 28 is similar to butt contact 26 and is provided with rear and forward cam followers 28*a* and 28*b*, shown in FIG. 2, although only forward cam follower 26*b* is used, as more fully described in the aforementioned Brown patent.

In the circuit diagram of FIG. 8, reference characters like those in FIGS. 1–4 are used to facilitate identification of the parts. Line L1 is connected to stationary contact 32. This is done by pushing the bare end of an insulated conductor between contact 32 and leaf, retainer spring 38 in FIG. 1. Line L2 is connected to connector 34. This is done by pressing a similar bear-ended conductor between connector 34 and leaf, retainer spring 40, FIGS. 2 and 4. The load which may be a universal motor is connected between stationary contacts 18 and 36.

The trigger is provided with cams as described in the aforementioned Brown patent arranged so that, upon initial depression of the trigger, the on-off switch closes. This includes the left pole having contacts 26, 32 and the right pole having contacts 28, 36. As a result, power is connected from line L1 in FIG. 8 through the first pole, SCR14, the load and the second pole of the switch to line L2.

Further depression of the trigger moves slider 12 rightward in FIG. 8 to reduce the amount of resistance 8 in the capacitor circuit. The amount of resistance in the circuit determines how fast the capacitor charges on each positive half-cycle of the A.C. source wave. When the capacitor charges to a voltage level supplying sufficient current to the gate of the SCR, the latter fires into conduction in its anode-cathode circuit. This allows current to flow in the load. Advancing the firing angle on each positive half-cycle by moving the slider to decrease the resistance increases the speed of the motor. Conversely, retarding the firing angle by moving the slider to increase the resistance decreases the motor speed.

The trigger is provided with a third cam forwardly at the left side as shown in FIG. 1 for closing shunting contact 18, 26. This contact is closed near the end of the trigger depression stroke, after the variable resistor 8 has been reduced to a minimum, for the full speed operation. As will be apparent this shunts the speed control circuit in FIG. 8 and connects the motor directly across the power lines.

FIGS. 5–7 show a modification of the invention. In this version, the connector 10 of FIGS. 1–4 along which the slider 12 slides has been eliminated. Instead, plastic pack 42 is now arranged upright with its mounting tab 42*a* at the top. Also, this mounting tab has been cut shorter and thus formed to act as the connector along which slider 12 slides at the same time as its slides along the resistor. Chip capacitor 16 is soldered across cathode and gate terminals 42*b* and 42*c*. A conductor 44 connects the cathode terminal to terminal 18*a* as in FIG. 3. Due to the relocation of the plastic pack semi-conductor, a conductor 46 is now used to connect the gate terminal to connector strap 20. The plastic pack semi-conductor may be secured to left base half L by any suitable means such as by cementing, epoxy or the like.

While the apparatus hereinbefore described is effectively adapted to fulfill the objects stated, it is to be understood that the invention is not intended to be confined to the particular preferred embodiments of trigger speed control switch with plastic pack semi-conductor disclosed, inasmuch as they are susceptible of various modifications without departing from the scope of the appended claims.

I claim:

1. A double-pole, variable control trigger switch comprising:

a return spring biased trigger adapted for operation by the forefinger of the user;

a frame mounting said trigger for movement therein and having a base-embracing portion;

a split base held fixed within said base-embracing portion of said frame with the tops of the base halves continguous to said trigger and defining therebetween a central compartment and defining with said frame left and right compartments;

double-pole switch means with one pole thereof in each said left and right compartment and means for operating said switch poles by said trigger;

and a semi-conductor variable control circuit in said central compartment comprising:

a plastic pack semi-conductor element having cathode and gate terminals;

a resistor strip at the top of said central compartment; an elongated connector disposed alongside said resistor strip and being electrically connected to the anode of said semiconductor element;

an electrical contact driven by said trigger to slide along said resistor strip and said connector to vary the amount of resistance in said variable control circuit;

a capacitor connected across said cathode and gate terminals;

and means for connecting said variable control circuit to said double-pole switch means and to an electric power source and load.

2. The switch defined in claim 1, wherein:

said capacitor is a chip capacitor electrically connected directly to bridge said cathode and gate terminals.

3. The switch defined in claim 1, wherein:

said capacitor is a ceramic capacitor having a pair of wire leads connected between said cathode and gate terminals.

4. The switch defined in claim 1, wherein:

said elongated connector is a T-shaped member having its lower portion secured to said anode of said semi-conductor element to suspend the latter in said central compartment.

5. The switch defined in claim 1, wherein:

said plastic pack semi-conductor also comprises a mounting tab serving as the anode terminal thereof;

and said elongated connector is a T-shaped member having its lower portion connected to said mounting tab of said semi-conductor element to support the latter in said central compartment.

6. The switch defined in claim 1, wherein:

said elongated connector comprises an edge of a mounting tab that is an integral part of said plastic pack semi-conductor element which mounting tab serves also as the anode terminal thereof.

7. A double-pole, speed control trigger switch comprising:

a frame having a trigger retaining portion and a base-embracing portion;

a trigger mounted in said trigger retaining portion for reciprocal movement;

a return spring biasing said trigger into an extended position from which it may be depressed by the forefinger of the user;

a split base held clamped within said base-embracing portion of said frame with the tops of the base halves underlying said trigger, said base halves defining therebetween a central compartment and defining with said base-embracing portion of said frame left and right compartments;

a double-pole switch having its two poles in said left and right compartments, respectively;

means on said trigger for operating said switch poles, and a semi-conductor speed control circuit in said central compartment comprising:

a plastic pack SCR having an anode, a cathode and a gate, said cathode and gate being connected to terminals projecting from said plastic pack SCR;

a resistor strip at the top of said central compartment;

an elongated connector in parallel spaced relation to said resistor strip and being electrically connected to said anode of said SCR;

a bridging contact driven by said trigger to slide along said resistor strip and said connector to vary the resistance in circuit;

a capacitor connected across said cathode and gate terminals to be charged through said variable resistor strip;

and means for connecting said speed control circuit to said double-pole switch and an A.C. power source and a portable tool motor.

8. The switch defined in claim 7, wherein:

said elongated connector is a mounting tab on said plastic pack SCR formed so that its edge lies alongside said resistor strip.

9. The switch defined in claim 7, wherein:

said plastic pack SCR also has a mounting tab formed integrally therewith and serving as its anode terminal and is a sensitive-gate type;

and said elongated connector comprises a metal member having a formed strip lying alongside said resistor strip whereby it is supported at the top of said central compartment, and a lower portion rigidly secured to said mounting tab.

10. The switch defined in claim 7, wherein:

said capacitor comprises a chip connected directly across said cathode and gate terminals so as to eliminate wire connections therebetween.

* * * * *